(12) United States Patent
Hirata et al.

(10) Patent No.: US 7,237,901 B2
(45) Date of Patent: Jul. 3, 2007

(54) PROJECTION TYPE IMAGE DISPLAY DEVICE, REAR PROJECTION TYPE IMAGE DISPLAY DEVICE, OPTICAL UNIT, AND SCREEN UNIT

(75) Inventors: Koji Hirata, Yokohama (JP); Tsutomu Nakashima, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 105 days.

(21) Appl. No.: 11/009,053

(22) Filed: Dec. 13, 2004

(65) Prior Publication Data

US 2005/0140926 A1 Jun. 30, 2005

(30) Foreign Application Priority Data

Dec. 26, 2003 (JP) .............................. 2003-432395

(51) Int. Cl.
*G03B 21/14* (2006.01)
(52) U.S. Cl. ............................... 353/20; 353/31; 349/9; 359/634
(58) Field of Classification Search ................. 353/20, 353/31, 33, 34, 37; 349/5, 7, 8, 9; 359/634, 359/638
See application file for complete search history.

(56) References Cited

U.S. PATENT DOCUMENTS

| 6,646,690 B1 | 11/2003 | Takezawa |
| 6,781,765 B2 * | 8/2004 | Edlinger et al. ............. 359/634 |
| 6,783,242 B1 * | 8/2004 | Hirata et al. .................. 353/20 |
| 6,795,249 B2 * | 9/2004 | Shioya ........................ 359/618 |
| 6,831,788 B2 * | 12/2004 | Kang .......................... 359/629 |
| 6,869,184 B2 * | 3/2005 | Yatsu et al. .................... 353/20 |
| 6,942,346 B2 * | 9/2005 | Nakada et al. ................ 353/31 |
| 2003/0048421 A1 * | 3/2003 | Du .............................. 353/31 |
| 2003/0193653 A1 * | 10/2003 | Belliveau ..................... 353/31 |
| 2003/0202129 A1 * | 10/2003 | Sekine et al. .................. 349/5 |
| 2004/0189948 A1 * | 9/2004 | Okuyama et al. ............. 353/20 |
| 2004/0239882 A1 * | 12/2004 | Hirata et al. .................. 353/20 |
| 2005/0012870 A1 * | 1/2005 | Hirata et al. ................... 349/8 |
| 2005/0140926 A1 * | 6/2005 | Hirata et al. .................. 353/20 |

FOREIGN PATENT DOCUMENTS

| CN | 2287310 | 8/1998 |
| CN | 1281995 | 1/2000 |
| JP | 2800812 | 7/1998 |
| JP | 2003-241146 | 8/2003 |

* cited by examiner

*Primary Examiner*—William C. Dowling
(74) *Attorney, Agent, or Firm*—Antonelli, Terry, Stout & Kraus, LLP.

(57) ABSTRACT

The present invention provides a projection type image display device capable of affording a bright display of a high saturation and capable of ensuring a high reliability of optical parts. The projection type image display device is provided with a color synthesizer for color-synthesizing modulated and polarized light of red light, green light, and blue light, outputted from an image display element. The color synthesizer has an optical characteristic such that the transmittance including reflection by a reflecting film in the interior of the color synthesizer becomes highest for the polarized light of blue light out of the modulated and polarized light of red light, that of green light, and that of blue light. The color synthesizer also has an optical characteristic such that the quantity of the polarized light of blue light outputted becomes largest out of the modulated and polarized light of red light, green light, and blue light.

9 Claims, 8 Drawing Sheets

PROJECTION TYPE IMAGE DISPLAY DEVICE, REAR PROJECTION TYPE IMAGE DISPLAY DEVICE, OPTICAL UNIT, AND SCREEN UNIT

CLAIM OF PRIORITY

The present application claims priority from Japanese application serial no. P2003-432395, filed on Dec. 26, 2003, the content of which is hereby incorporated by reference into this application.

BACKGROUND OF THE INVENTION

The present invention relates to a projection type image display, in which light emitted from a light source side is radiated onto an image display element such as a liquid crystal panel and an optical image corresponding to a video signal is formed and projected on a larger scale.

A conventional technique related to the present invention is described, for example, in Japanese Patent No. 2800812 (Patent Document 1). In Patent Document 1, as a prism for color synthesis of light after modulated by a transmission type light valve, there is described a prism having two types of dichroic surfaces. The surfaces reflect red light (hereinafter referred to as "R light") and blue light ("B light" hereinafter) and transmit green light ("G light" hereinafter).

SUMMARY OF THE INVENTION

In the conventional technique described in Patent Document 1, for example in case of using an ultra-high pressure mercury vapor lamp as a light source and a filter to cut off ultraviolet light, the quantity of B light on an optical path becomes smaller than that of light of any other color. Consequently, the color temperature of white drops and a somber white color results. On the other hand, as to G light, its brightness is ensured because of a large quantity of light. However, due to an increased difference in quantity of G light from B light, the light resulting from color synthesis becomes greenish light, so that the grade of image is deteriorated.

The present invention has been accomplished in view of the above-mentioned problem. In connection with a projection type image display device, the present invention provides a technique capable of ensuring brightness and suppressing the drop of the white color temperature, thereby increasing saturation and ensuring the grade of image. Further, in connection with a projection type image display device, the present invention provides a technique capable of affording a bright display of high saturation and high image quality and capable of ensuring the reliability of such optical parts as a polarizing plate and a panel.

The projection type image display device according to the present invention is provided with a color synthesizer having such an optical characteristic as maximizes the transmittance, including reflection by an internal reflecting film, of polarized light of B light out of R light, G light, and B light, after modulated by an image display element. The color synthesizer also has such an optical characteristic as maximizes the quantity of output polarized light of B light. The projection type image display device according to the present invention is further provided with a screen unit having a transmittance of at least B light of about 75% or more.

According to the present invention, in the projection type image display device thereof, not only a bright display of high saturation and high image quality is obtained, but also it is possible to ensure the reliability of such optical parts as a polarizing plate and a panel.

DETAILED DESCRIPTION OF THE PREFERRED EMBODIMENTS

Best modes for practicing the present invention will be described hereinunder with reference to the accompanying drawings.

Figure 1:
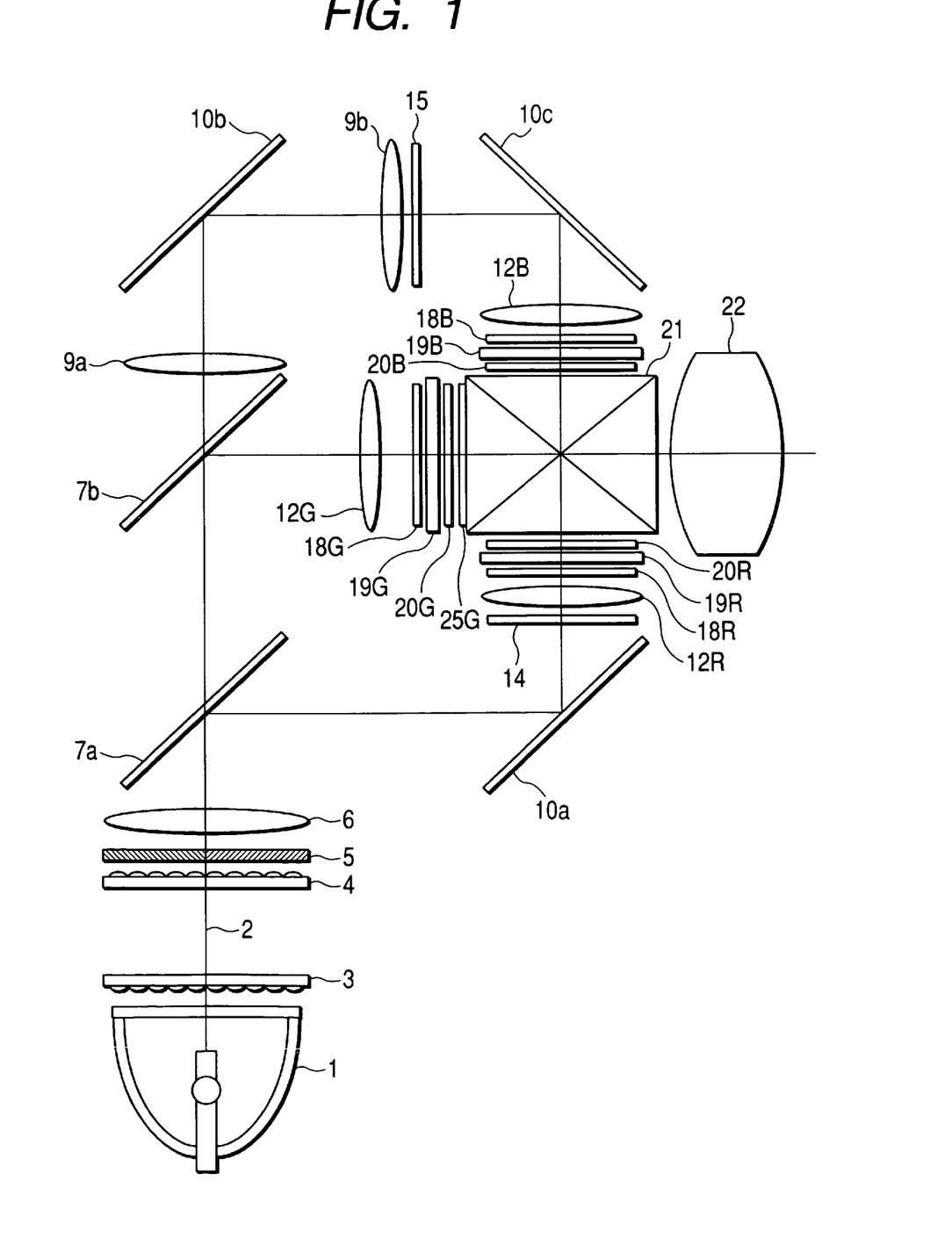
FIG. 1 shows the construction of a projection type image display device according to a first embodiment of the present invention.

First, with reference to FIGS. 1 to 5B, a description will be given of a first embodiment of the present invention. In FIG. 1, the numeral 1 denotes a light source unit and numeral 2 denotes an optical axis of a lighting system. Numeral 3 denotes a first array lens, which comprises a plurality of very small condenser lenses and which forms a plurality of secondary light sources to make the luminance distribution in a beam section uniform. Numeral 4 denotes a second array lens which also comprises a plurality of very small condenser lenses and which is for forming individual lens images of the first array lens 3. Numeral 5 denotes a polarization converter, which includes a polarization beam splitter and a half-wave plate. After separation of light emitted from the second array lens 4 to P-polarized light and S-polarized light, the polarization converter 5 turns the polarization direction of the P-polarized light into S-polarized light. Numeral 6 denotes a condenser lens for the condensation of light and numerals 7a and 7b denote dichroic mirrors as separators for color-separating the S-polarized light by reflection and transmission. The dichroic mirror 7a is a red light reflecting dichroic mirror, which reflects R light (red light) and transmits B light (blue light) and G light (green light). The dichroic mirror 7b is a green light reflecting dichroic mirror, which reflects G light and transmits B light. Numerals 9a and 9b denote field lenses, numerals 10a, 10b, and 10c denote total reflection mirrors, and numerals 12R, 12G, and 12B denote condenser lenses. Numeral 14 denotes a trimming filter for reflectively removing yellow light contained in the R light, which has been reflected by the red light reflecting dichroic mirror 7a. Numeral 15 denotes a UV filter for removing ultraviolet light. Numeral 19R denotes a transmission type liquid crystal panel for red light, which serves as an image display element, numeral 19G likewise denotes a transmission type liquid crystal panel for green light, and numeral 19B likewise denotes a transmission type liquid crystal panel for blue light. Numerals 18R, 18G, and 18B denote incidence-side polarizing plate, while numerals 20R, 20G, and 20B denote output-side polarizing plates. Numeral 25G denotes a half-wave plate and numeral 21 denotes a dichroic prism as a color synthesizer. Numeral 22 denotes a projection lens unit for projecting color-synthesized light from the dichroic prism 21 onto a screen (not shown) on a larger scale. The transmission type liquid crystal panels 19R, 19G, and 19B, for red light, green light, and blue light, respectively, are each driven in accordance with a video signal by means of a drive circuit (not shown). The dichroic prism 21 transmits polarized light of B light out of polarized light of R light, polarized light of G light, and polarized light of B light, after modulated by the transmission type liquid crystal panels 19R, 19G, and 19B, in a state in which the entire transmittance including reflection by an interior reflecting film becomes highest or in a state in which the quantity of output light becomes largest. Then, the polarized light of B light is color-synthesized with polarized light of R light and that of G light. The optical system from the light source unit 1 up to the projection lens unit 22 constitutes an optical unit in this projection type image display device.

The light emitted from the light source unit 1 passes through the first array lens 3, whereby a plurality of secondary light sources are formed. Thereafter, the plural secondary light sources are imaged in the second array lens 4. The imaged light is then separated into P-polarized light and S-polarized light of white light by means of a polarization beam splitter (not shown) disposed within the polarization converter 5. Further, by means of a half-wave plate also disposed within the polarization converter 5, the polarization direction of the separated P-polarized light is turned into S-polarized light, which is then outputted together with the S-polarized light separated by the polarization beam splitter. The S-polarized light is incident on the red light reflecting dichroic mirror 7a through the condenser lens 6. In a color separation film of the red light reflecting dichroic mirror 7a, out of the S-polarized light of white light, the S-polarized light of R light is reflected, while S-polarized light of G light plus B light is transmitted. The reflected R light is further reflected by the total reflection mirror 10a, and the trimming filter 14a removes a yellow light component contained in the R light. The R light then passes through the condenser lens 12R and is incident on an incidence-side polarizing plate 18R. In the incidence-side polarizing plate 18R, light having a predetermined polarization direction is transmitted and the purity of polarization is enhanced. The S-polarized light of R light emerging from the incidence-side polarizing plate 18R is incident on the transmission type liquid crystal panel 19R. In the transmission type liquid crystal panel 19R, a voltage is applied to a TFT electrode in accordance with the amplitude of a video signal. With a change of this voltage, the twist quantity of light changes and the polarization axis shifts, so that the output-side polarizing plate absorbs the light. As a result, the intensity of light is modulated with the voltage applied to each pixel, whereby an optical image is formed throughout the whole of the panel. The S-polarized light of R light modulated by the transmission type liquid crystal panel 19R passes through the output-side polarizing plate 20R and is incident on the dichroic prism 21. Within the dichroic prism 21, the S-polarized light of R light thus introduced is reflected by a first reflecting film 50a. The reflected light then passes through the dichroic prism 21 and enters the projection lens unit 22.

On the other hand, the S-polarized light of G light plus B light is incident on the dichroic mirror 7b for green light reflection. In a color separation film of the dichroic mirror 7b, G light is reflected, while B light is transmitted. The reflected G light passes through the condenser lens 12G and is incident on the incidence-side polarizing plate 18G. In the incidence-side polarizing plate 18G, light having a predetermined polarization direction is transmitted and the purity of polarization is enhanced. The S-polarized light of G light from the incidence-side polarizing plate 18G is incident on the transmission type liquid crystal panel 19G. This incident light is modulated in accordance with a video signal by the transmission type liquid crystal panel 19G, whereby an optical image is formed on the panel. The S-polarized light of G light, which has been modulated by the transmission type liquid crystal panel 19G, passes through the output-side polarizing plate 20G and is incident on a half-wave plate 25G. In the half-wave plate 25G, the S-polarized light of G light is converted to P-polarized light. The P-polarized light of G light emerging from the half-wave plate 25G is incident on the dichroic prism 21. Within the dichroic prism 21, the incident P-polarized light of G light passes through a first reflecting film 50a and a second reflecting film 50b, then is outputted and is incident on the projection lens unit 22.

The S-polarized light of B light having passed through the dichroic mirror 7b for green light reflection then passes through the field lens 9a and is reflected by the total reflection mirror 10b, whereby its optical path direction is changed. The thus-reflected light then passes through the field lens 9b and UV filter 15 and is reflected by the total reflection mirror 10c. The thus-reflected S-polarized light of B light passes through the condenser lens 12B and is incident on the incidence-side polarizing plate 18B. In the incidence-side polarizing plate 18B, light having a predetermined polarization direction is transmitted and the purity of polarization is enhanced. The S-polarized light of B light emerging from the incidence-side polarizing plate 18B is incident on the transmission type liquid crystal panel 19B. This incident light is modulated in accordance with a video signal by the transmission type liquid crystal panel 19B. As a result, an optical image is formed on the panel. The S-polarized light of B light modulated by the transmission type liquid crystal panel 19B passes through the output-side polarizing plate 20B and is incident on the dichroic prism 21. Within the dichroic prism 21, the S-polarized light of B light is reflected by the second reflecting film 50b. This reflected light then passes through the dichroic prism 21 and is outputted, then enters the projection lens unit 22. With the dichroic prism 21, the S-polarized light of R light reflected by the first reflecting film 50a, the S-polarized light of B light reflected by the second reflecting film 50b, and the P-polarized light of G light having passed through the first and second reflecting films 50a and 50b, are color-synthesized and outputted as light of white color.

The dichroic prism 21 is designed so that the transmittance of the S-polarized light of B light becomes higher-than that of the S-polarized light of R light and that of the P-polarized light of G light. In addition, the quantity of the S-polarized light of B light outputted from the dichroic prism 21 becomes larger than that of the S-polarized light of R light and that of the P-polarized light of G light. In the case of the S-polarized light of B light, the transmittance of the dichroic prism 21 becomes a function of the product of the reflectance of the second reflecting film 50b and the transmittance of the base material of the prism. In the case of the S-polarized light of R light, the transmittance in question becomes a function of the product of the reflectance of the first reflecting film 50a and that of the base material of the prism. Further, in the case of the P-polarized light of G light, the transmittance in question becomes a function of the product of the transmittance of the second reflecting film 50b and that of the material of the prism. More specifically, for example, the reflection characteristic and/or the transmission characteristic of one or both of the second reflecting film 50b or the first reflecting film 50a in the dichroic prism 21 are (is) changed. Thus, the reflectance of the S-polarized light of B light in the second reflecting film 50b is made higher than the reflectance of the S-polarized light of R light in the first reflecting film 50a and/or the transmittance the P-polarized light of G light in the first and second reflecting films 50a and 50b. Further, the reflection quantity of the S-polarized light of B light in the second reflecting film 50b is made larger than that of the S-polarized light of R light in the first reflecting film 50a and/or the transmission quantity of the P-polarized light of G light in the first and second reflecting films 50a and 50b. As a result, the quantity of the S-polarized light of B light outputted from the dichroic prism 21 can be made larger than that of the polarized light of the other colors' light.

Figure 2:
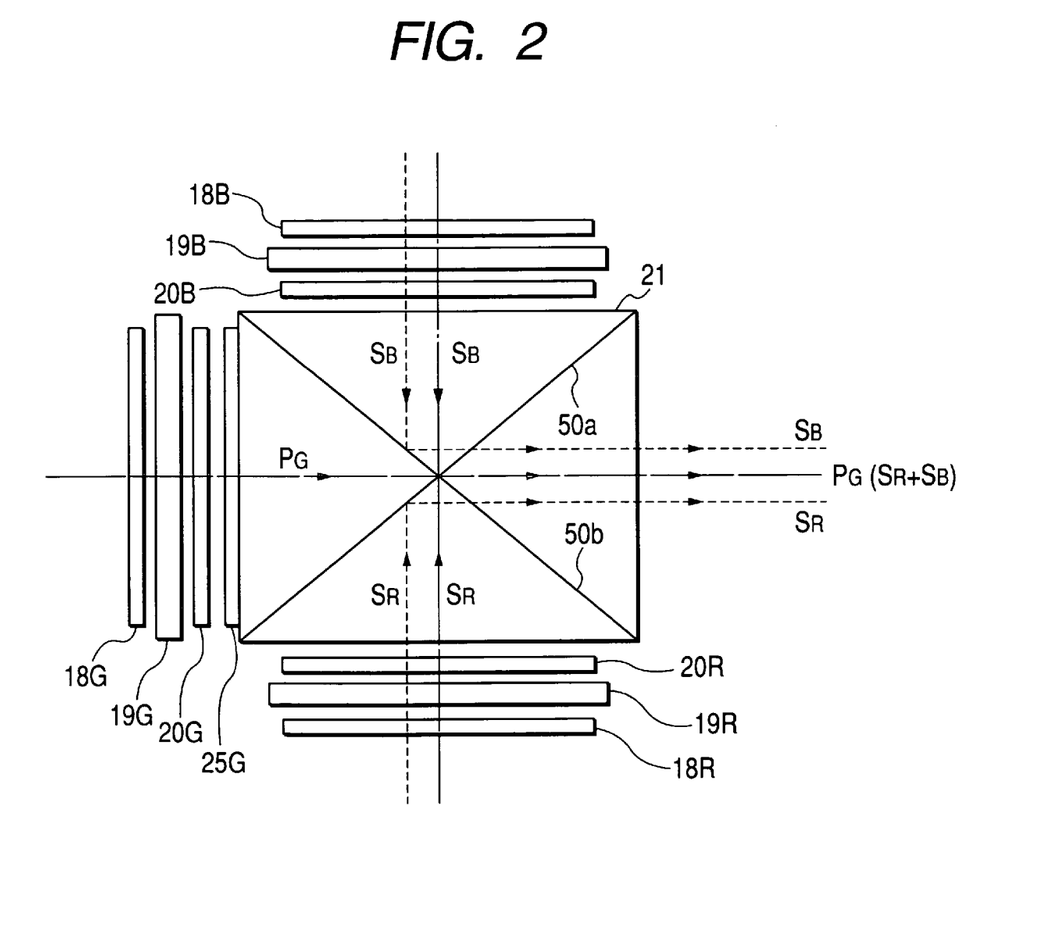
FIG. 2 is an explanatory diagram of a dichroic prism used in the projection type image display device shown in FIG. 1.

In FIGS. 2 to 5B, the same constituent elements as in FIG. 1 are identified by the same reference numerals as in FIG. 1. In FIG. 2, S-polarized light $S_R$ of R light modulated by the transmission type liquid crystal panel 19R passes through the output-side polarizing plate 20R and is incident on the dichroic prism 21. This incident light is reflected by the first reflecting film 50a within the dichroic prism 21, then passes through the same prism and is outputted to the exterior. Likewise, S-polarized light $S_B$ of B light modulated by the transmission type liquid crystal panel 19B passes through the output-side polarizing plate 20B and is incident on the dichroic prism 21. This incident light is reflected by the second reflecting film 50b within the dichroic prism 21, then passes through the same prism and is outputted to the exterior. Further, S-polarized light of G light modulated by the transmission type liquid crystal panel 19G passes through the output-side polarizing plate 20G and is incident on the half-wave plate 25G, whereby it is converted to P-polarized light $P_G$. The P-polarized light $P_G$ of G light emerging from the half-wave plate 25G is incident on the dichroic prism 21. This incident light passes through the first and second reflecting films 50a and 50b within the dichroic prism 21, then passes through the same prism and is outputted to the exterior. The S-polarized light $S_R$ of R light reflected by the first reflecting film 50a, the S-polarized light $S_B$ of B light reflected by the second reflecting film 50b, and the P-polarized light $P_G$ of G light, which has passed through the first and second reflecting films 50a and 50b, are outputted in a mutually color-synthesized state from the dichroic prism 21. In this construction, the reflectance of the S-polarized light $S_B$ of B light in the second reflecting film 50b is made higher than both the reflectance of the S-polarized light $S_R$ of R light and the transmittance of the P-polarized light $P_G$ of G light in the first and second reflecting films 50a and 50b. The output light quantity of the S-polarized light $S_B$ of B light is made larger than both the output light quantity of the S-polarized light $S_R$ of R light and that of the P-polarized light $P_G$ of G light.

Figure 3A:
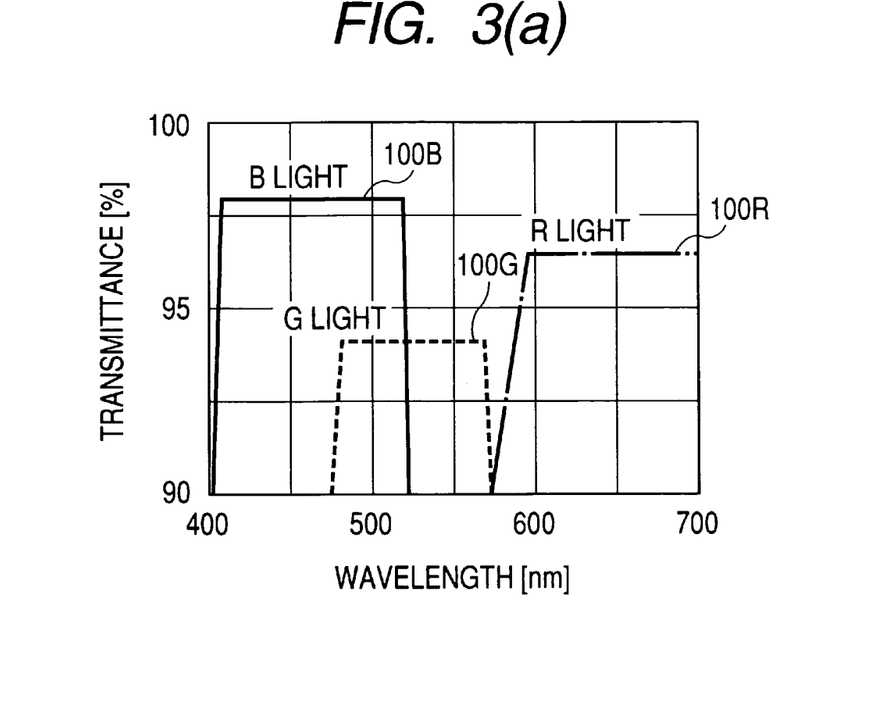
FIGS. 3A and 3B are explanatory diagrams showing transmittance characteristics of the dichroic prism shown in FIG. 2.
Figure 3B:
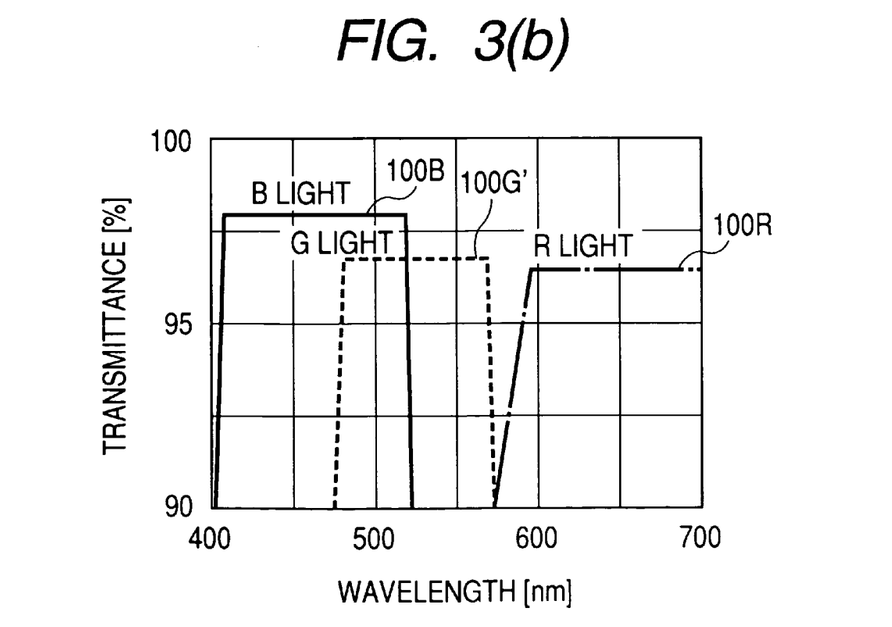

FIGS. 3A and 3B are explanatory diagrams of the entire transmission characteristics in the dichroic prism 21 shown in FIG. 2. Both FIGS. 3A and 3B show basic characteristics wherein the transmittance of B light, indicated at 100B, is higher than the other color light transmittances, indicated at 100R and 100G. FIG. 3A shows the case where the transmittance 100R of R light is higher than the transmittance 100G of G light. FIG. 3B shows the case where the transmittance of G light, indicated at 100G', is higher than the transmittance 100R or R light. In both characteristics of FIGS. 3A and 3B, the transmittance 100B of B light is higher than the other color light transmittances and it is possible to increase the quantity of light outputted from the dichroic prism 21. Consequently, not only the white color temperature is raised but also the brightness is improved.

Figure 4:
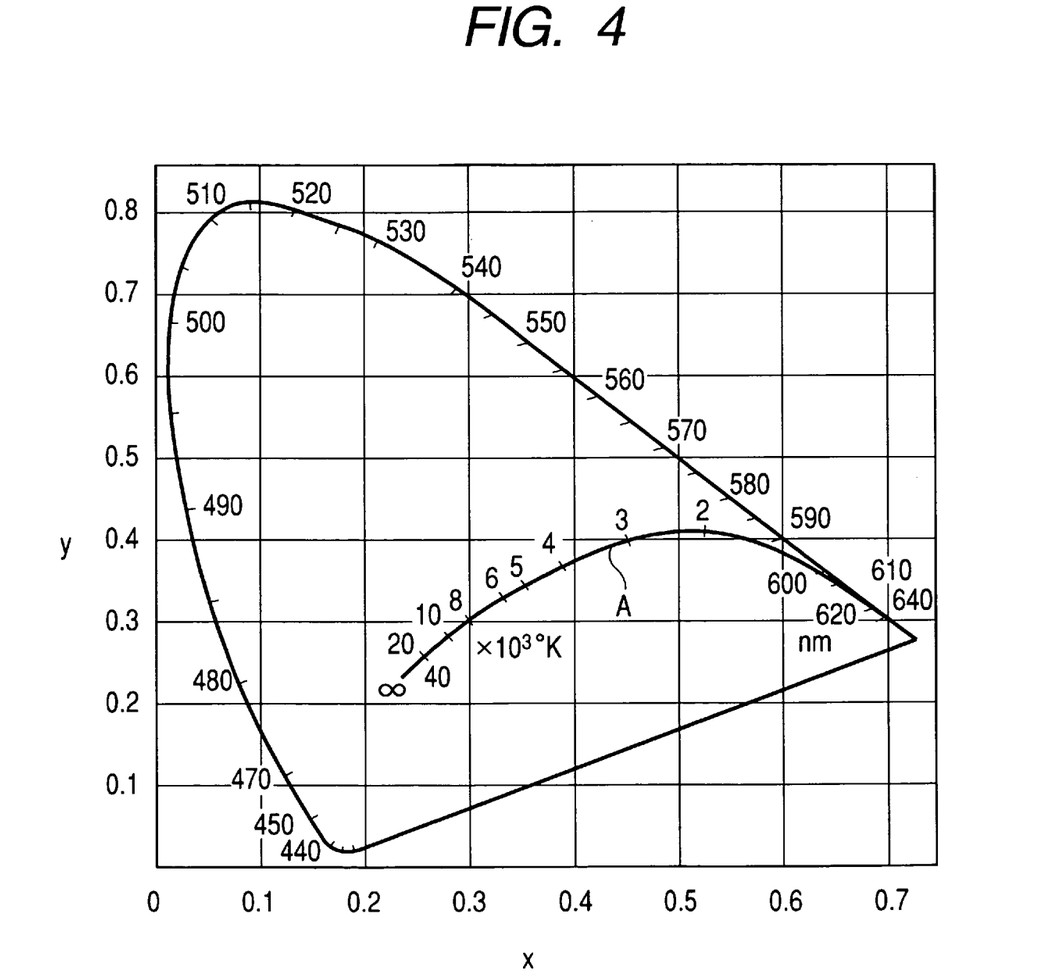
FIG. 4 shows a black body locus.

In FIG. 4, the mark A represents a black body locus. As described above, the quantity of B light outputted from the dichroic prism 21 is made larger than those of G light and R light. As a result, the white color temperature becomes high, an operating point shifts to the origin side of chromaticity coordinates on the black body locus A, and a bright white color of a small Y value is reproduced. In case of using a white color of a high color temperature exceeding 12000° K for example in a television set, the use of the dichroic prism 21 suppresses the quantity of G light relative to that of B light. Therefore, not only the above bright white color is obtained but also it becomes possible to attain a high contrast.

Figure 5A:
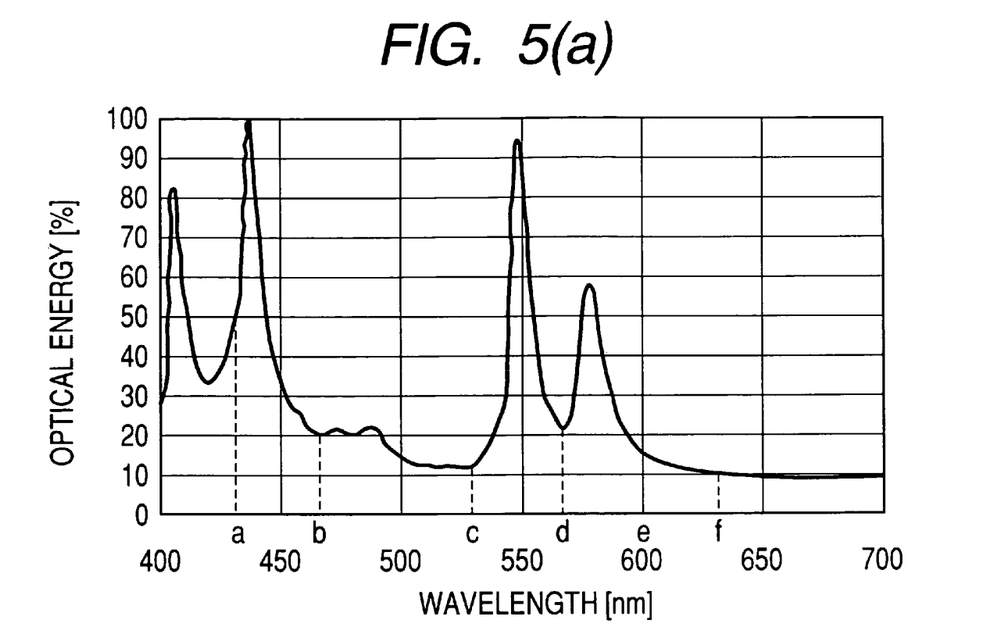
FIGS. 5A and 5B show examples of emission spectrum distribution and an example of a spectral luminous efficiency.
Figure 5B:
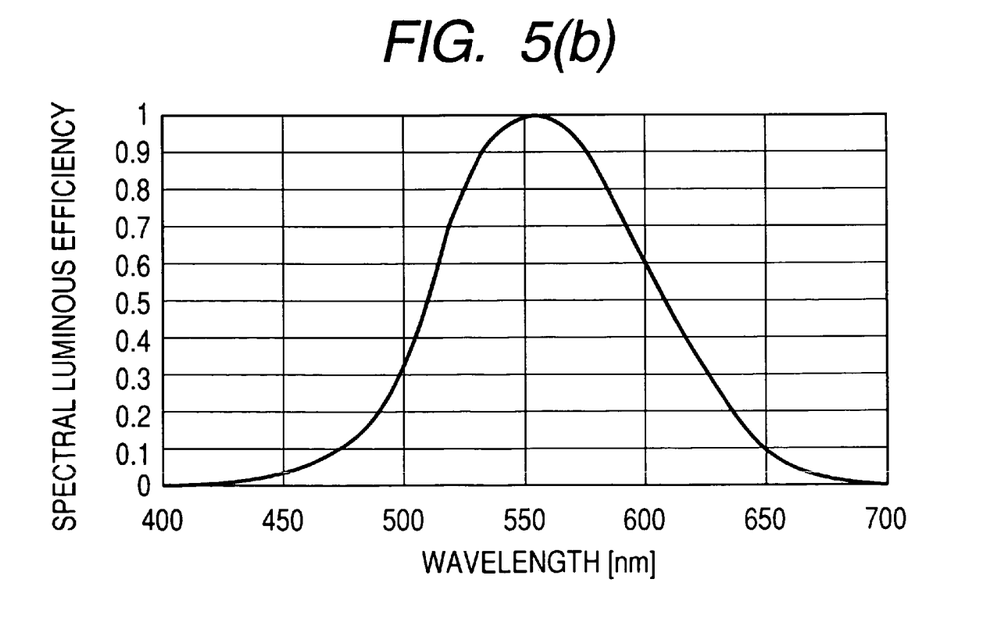

FIGS. 5A and 5B show examples of an emission spectrum distribution of a light source and a human eyes' spectral luminous efficiency. FIG. 5A shows an example of an emission spectrum distribution in the use of an ultra-high pressure mercury vapor lamp. FIG. 5B shows a spectral luminous efficiency. As shown in FIG. 5A, the optical energy of the ultra-high pressure mercury vapor lamp is high in both B light and G light and is low in R light. For example, in the case where a UV filter for the removal of ultraviolet light is provided on the optical path, the UV filter removes also the B light component, so that the quantity of B light decreases. On the other hand, the human eyes' spectral luminous efficiency is high in G light and low in both B light and R light, as shown in FIG. 5B. Therefore, for improving chromaticity to ensure an image color balance, it is necessary to increase the quantity of B light. In increasing the quantity of B light, in order to suppress the rise in temperature of a polarizing plate and a liquid crystal panel the quantity of B light is increased during transmission of B light through the dichroic prism 21 after the B light has passed through the polarizing plate and the liquid crystal panel.

In the first embodiment of the present invention described above, the transmittance of B light through the dichroic prism 21 after passing through a polarizing plate and a transmission type liquid crystal panel is increased to increase the quantity of light. Consequently, it is possible to suppress the rise in temperature of such optical parts as the polarizing plate and the transmission type liquid crystal panel and ensure their reliability. Further, there is obtained a bright white color high in color temperature and close to the black body locus A (=a small Y value) and there are attained high contrast and high light quantity.

Figure 6:
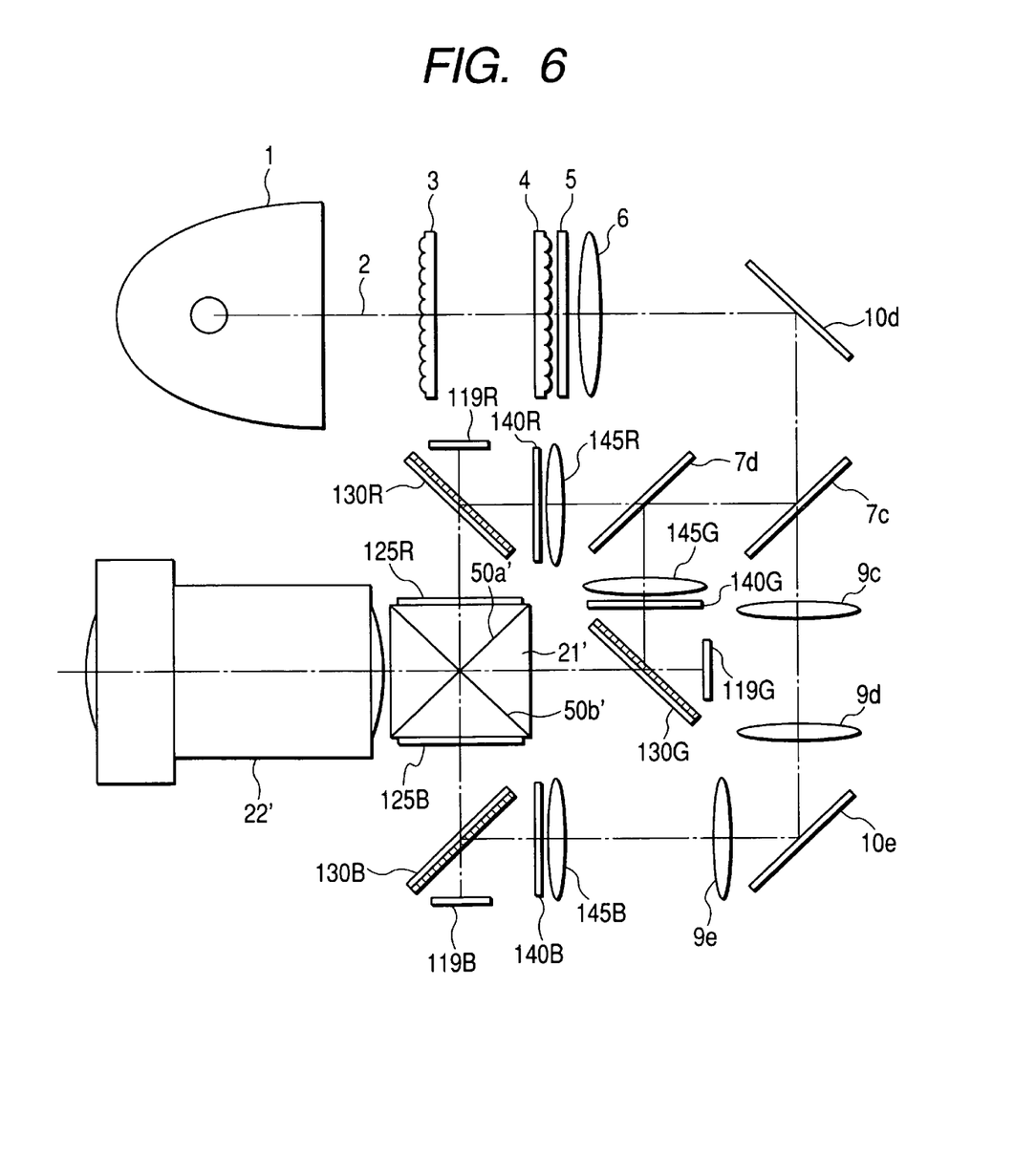
FIG. 6 shows a constructional example of a projection type image display device according to a second embodiment of the present invention.

FIG. 6 shows a constructional example of a projection type image display device according to a second embodiment of the present invention. In this projection type image display device, a reflection type liquid crystal panel is used as an image display element. In FIG. 6, the numeral 1 denotes a light source unit, numeral 2 denotes an optical axis of an optical path of a lighting system, numeral 3 denotes a first array lens, and numeral 4 denotes a second array lens. Numeral 5 denotes a polarization converter. After separation of white light outputted from the second array lens 4 into P-polarized light and S-polarized light, the polarization converter 5 turns the polarization direction of the P-polarized light out of the P- and S-polarized light into S-polarized light. Numeral 6 denotes a condenser lens for the condensation of light. Numerals 7c and 7d denote dichroic mirrors as separators for color-separating the S-polarized light by reflection and transmission. The dichroic mirror 7c denotes a blue light transmitting dichroic mirror, which reflects R light and G light and transmits B light. The dichroic mirror 7d denotes a red light transmitting dichroic mirror, which reflects G light and transmits R light. Numerals 9c, 9d, and 9e denote field lenses and numerals 10d and 10e denote total reflection mirrors. Numerals 119R, 119G, and 119B denote a red light reflecting liquid crystal panel, a green light reflecting liquid crystal panel, and a blue light reflecting liquid crystal panel, respectively, as image display elements. Numeral 130R denotes a polarization beam splitter (hereinafter referred to as "PBS for red light") which reflects S-polarized light of R light and transmits P-polarized light thereof, numeral 130G denotes a polarization beam splitter ("PBS for green light") which reflects S-polarized light of G light and transmits P-polarized light thereof, and numeral 130B denotes a polarization beam splitter ("PBS for blue light" hereinafter) which reflects S-polarized light of B light and transmits P-polarized light thereof. Numeral 140R denotes a trimming filter for red light used to enhance the color purity of R light, numeral 140G denotes a trimming filter for green light used to enhance the color purity of G light, and numeral 140B denotes a trimming filter for blue color used to enhance the color purity of B light. Numerals 145R, 145G, and 145B denote condenser lenses and numeral 21' denotes a dichroic prism as a color synthesizing means. Numerals 125R and 125B denote half-wave plates and numeral 22' denotes a projection lens unit. The reflection type liquid crystal panels 119R, 119G, and 119B for red, green, and blue light, respectively, are each driven in accordance with a video signal by means of a drive circuit (not shown). Polarized light of R light, that of G light, and that of B light, which have been modulated by the reflection type liquid crystal panels 119R, 119G, and 119B, respectively, are incident on the dichroic prism 21'. Among them, particularly the incident polarized light of B light is passed through the dichroic prism 21' in a state in which the entire transmittance including the reflection by an interior reflection film is made highest or the output light quantity is largest. Then, the polarized light of B light is color-synthesized with the light of the other colors. The optical system from the light source unit 1 up to the projection lens unit 22' constitutes an optical unit in this projection type image display device.

In the above construction, the light emitted from the light source unit 1 passes through the first array lens 3, whereby a plurality of secondary light sources are formed. Thereafter, the plural secondary light sources are imaged in the second array lens 4. The imaged light is then separated into P-polarized light and S-polarized light of white light by means of a polarization beam splitter (not shown) within the polarization converter 5. The polarization direction of the thus-separated P-polarized light is turned into S-polarized light by a half-wave plate (not shown) also within the polarization converter 5. This S-polarized light is combined with the S-polarized light separated by the polarization beam splitter. The combined S-polarized light then passes through the condenser lens 6 and is reflected by the total reflection mirror 10d, whereby the optical path direction is changed. The S-polarized light of white light reflected by the total reflection mirror 10d is incident on the dichroic mirror 7c for the transmission of blue light. Of the S-polarized light of white color, S-polarized light of B light is transmitted, while S-polarized light of G light plus R light is reflected, with a color separation film in the dichroic mirror 7c. The reflected S-polarized light of G light plus R light is incident on the dichroic mirror 7d for the transmission of red light. In the dichroic mirror 7d, S-polarized light of R light is transmitted, while S-polarized light of G light is reflected. The transmitted S-polarized light of R light passes through the trimming filter 140R for red color, then is incident on and is reflected by the PBS 130R for red light. The reflected light is radiated to the reflection type liquid crystal panel 119R for red light. The radiated S-polarized light of R light is modulated in accordance with a video signal by the reflection type liquid crystal panel 119R for red light. The modulated light is converted to P-polarized light to form an optical image, and is outputted in the direction of reflection. The P-polarized light of R light thus outputted passes through the PBS 130R for red light and is incident on the half-wave plate 125R, whereby it is again converted to S-polarized light. The thus-converted S-polarized light enters the dichroic prism 21'. Within the dichroic prism 21', the incident S-polarized light of R light is reflected by a first reflecting film 50a', passes through the dichroic prism 21', then is outputted and enters the projection lens unit 22'.

On the other hand, the S-polarized light of G light reflected by the red light transmitting dichroic mirror 7d passes through the condenser lens 145G and the green light trimming filter 140G and is incident on the PBS 130G for green light. This incident light is then reflected by the PBS 130G for green light and is radiated to the reflection type liquid crystal panel 119G for green light. The thus-radiated S-polarized light of G light is modulated in accordance with a video signal by the reflection type liquid crystal panel 119G for green light. The modulated light is converted to P-polarized light and forms an optical image, then is outputted in the direction of reflection. The outputted P-polarized light of G light passes through the PBS 130G for green light and is incident on the dichroic prism 21'. Within the dichroic prism 21', the P-polarized light of G light passes through the first and second reflecting films 50a' and 50b', then passes through the dichroic prism 21' and is outputted, then enters the projection lens unit 22'.

The S-polarized light of B light which has passed through the blue light transmitting dichroic mirror 7c passes through the field lenses 9c and 9d, then is reflected by the total reflection mirror 10e and the optical path direction is changed thereby. This reflected light passes through the field lens 9e, further through the condenser lens 145B and the blue light trimming filter 140B and is incident on the PBS 130B for blue light. This incident light is reflected by the PBS 130B for blue color and is radiated to the reflection type liquid crystal panel 119B for blue color. The thus-radiated S-polarized light of B light is modulated in accordance with a video signal by the reflection type liquid crystal panel 119B for blue color. The modulated light is converted to P-polarized light and forms an optical image, then is outputted in the direction of reflection. The outputted P-polarized light of B light passes through the PBS 130B for blue light and enters the half-wave plate 125B, then is again converted to S-polarized light by the half-wave plate 125B. The thus-converted S-polarized light of B light enters the dichroic prism 21'. Within the dichroic prism 21', the incident light is reflected by the second reflecting film 50b', passes through the dichroic prism 21' and is outputted, then enters the projection lens unit 22'.

The S-polarized light of R light reflected by the first reflecting film 50a', the P-polarized light of G light having passed through the first and second reflecting films 50a' and 50b', and the S-polarized light of B light reflected by the second reflecting film 50b' are outputted from the dichroic prism 21' in a mutually color-synthesized state. The thus-synthesized light enters the projection lens unit 22'.

The dichroic prism 21' is designed so that the transmittance of the S-polarized light of B light becomes higher than that of the S-polarized light of R light and that of the P-polarized light of G light. Further, the quantity of the S-polarized light of B light outputted from the dichroic prism 21' becomes larger than that of the S-polarized light of R light and that of the P-polarized light of G light. In the case of the S-polarized light of B light, the transmittance of the dichroic prism 21' is a function of the product of the reflectance of the second reflecting film 50b' and the transmittance of the base material of the prism. In the case of S-polarized light of R light, the transmittance of the dichroic prism 21' is a function of the product of the first reflecting film 50a' and that of the base material of the prism. Further, in the case of P-polarized light of G light, the transmittance of the dichroic prism 21' is a function of the product of the transmittance of the first reflecting film 50a', that of the second reflecting film 50b', and that of the base material of the prism. More specifically, in this embodiment, the reflection and transmission characteristics of one or both of the first and second reflecting films 50a' and 50b' in the interior of the dichroic prism 21' are changed. Thus, the reflectance of the S-polarized light of B light in the second reflecting film 50b' becomes higher than the reflectance of the S-polarized light of R light in the first reflecting film 50a' and/or the transmittance of the P-polarized light of G light in the first and second reflecting films 50a' and 50b'. The quantity of the S-polarized light of B light reflected in the second reflecting film 50b' becomes larger than the quantity of the S-polarized light of R light reflected in the first reflecting film 50a' and/or the quantity of the P-polarized light of G light transmitted through the first and second reflecting films 50a' and 50b'. Further, the quantity of the S-polarized light of B light outputted from the dichroic prism 21' is made larger than that of the polarized light of the other colors.

Also in this second embodiment, the transmittance in the dichroic prism 21' of B light after passing through a reflection type liquid crystal panel is increased to increase the quantity of the light. Consequently, it is possible to prevent a rise in temperature of optical parts such as the reflection type liquid crystal panel and ensure a high reliability. Further, there is obtained a bright white color high in color temperature and close to the black body locus A. (FIG. 4) (=a small Y value). At the same time, both high contrast and large quantity of light can be attained.

Figure 7:
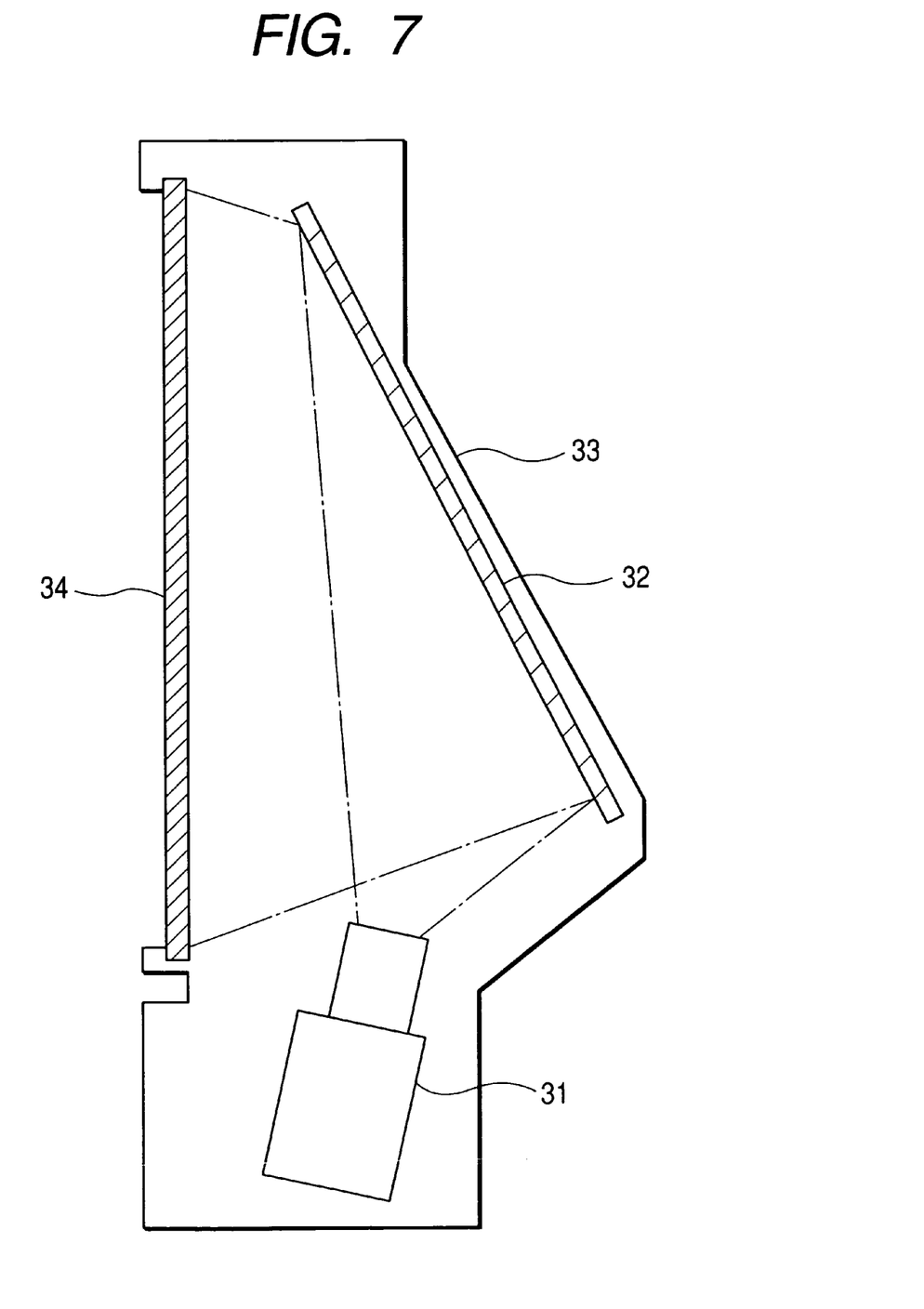
FIG. 7 shows a constructional example of a rear projection type image display device according to a third embodiment of the present invention.
Figure 8A:
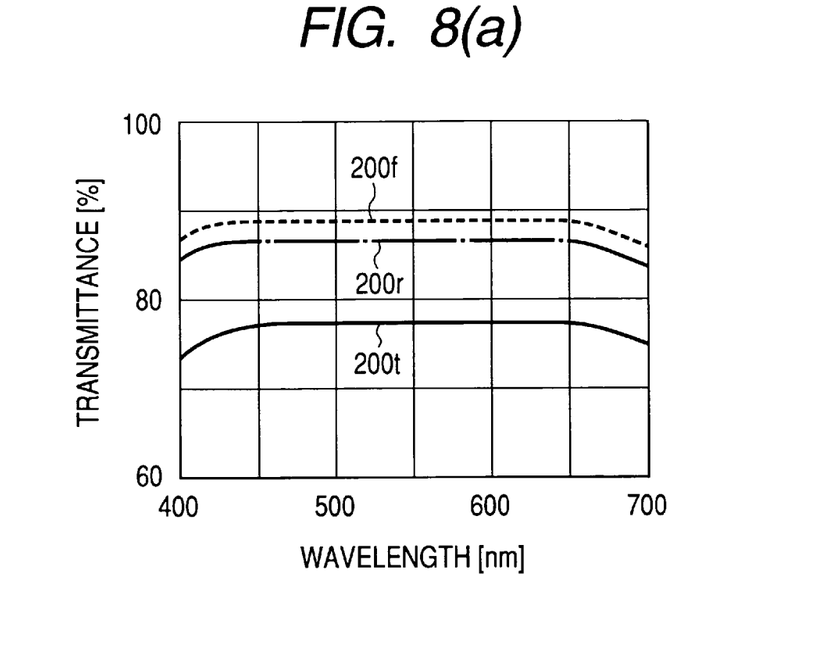
FIGS. 8A and 8B show the transmittance of a screen unit used in the device shown in FIG. 7.
Figure 8B:
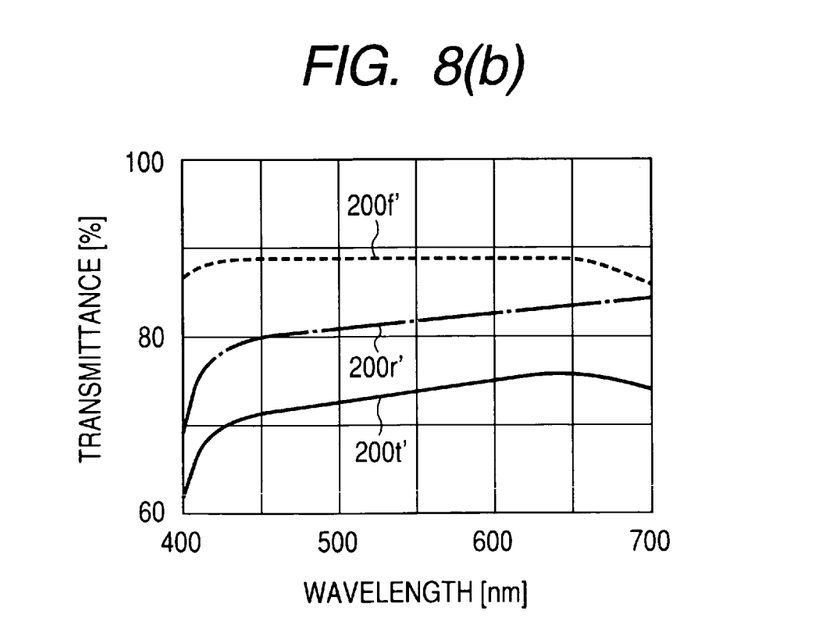

FIGS. 7 and 8 show the construction of a third embodiment of the present invention. In FIG. 7, numeral 31 denotes a projection type image display device which outputs image light from a projection lens unit, numeral 32 denotes a mirror, numeral 33 denotes a housing, and numeral 34 denotes a screen unit. For example, as the projection type image display device 31, one constructed as in the first or the second embodiment is used. In the illustrated construction, light (synthesized light of R light, G light, and B light) projected from the projection type image display device 31 is reflected by the mirror 32, and is radiated to the screen unit 34. The radiated light passes through the screen unit 34 from a rear side toward a surface side of the screen unit to display an image on the surface side. The screen unit 34 includes a lenticular lens portion and a Fresnel lens portion and has a B light transmittance of about 75% or more.

FIGS. 8A and 8B are diagrams explanatory of the transmittance of the screen unit 34 shown in FIG. 7. FIG. 8A shows the transmittance of the screen unit 34 used in the third embodiment. FIG. 8B shows the transmittance of a screen unit used in the prior art.

In FIG. 8, a screen unit transmittance 200t is given as the product of a Fresnel lens transmittance 200f and a lenticular lens transmittance 200r. Further, a screen unit transmittance 200t' is given as the product of a Fresnel lens transmittance 200f' and a lenticular lens transmittance 200r'. In the screen unit 34, as shown in FIG. 8A, the lenticular lens transmittance 200r for B light and G light is greatly improved (increased) in comparison with the conventional transmittance 200r'. Moreover, in the screen unit 34, the transmittance 200t for B light is about 75% or more. When the optical unit related to the first embodiment is used in the projection type display device 31, the transmittance for B light is increased to increase the quantity of B light within the dichroic prism 21 and also within the screen unit 34. Consequently, an image having sufficient contrast and brightness is displayed on the screen unit 34 while preventing a rise in temperature of polarizing plates and transmission type liquid crystal panels within the projection type display device 31 to ensure a high reliability. Also when the optical unit related to the second embodiment is used in the projection type image display device 31, the transmittance for B light is increased to increase the quantity of B light within the dichroic prism 21' and also within the screen unit 34. Consequently, an image having sufficient contrast and brightness is displayed on the screen unit 34 while preventing a rise in temperature of optical parts such as reflection type liquid crystal panels to ensure a high reliability.

Thus, in the rear projection type image display device according to the third embodiment of the present invention, an image having sufficient contrast and brightness can be displayed on the screen unit 34 while ensuring a high reliability of optical parts such as image display elements and polarizing plates. Although liquid crystal panels are used as image display elements in the above embodiments, no limitation is made thereto. Other image display elements than the liquid crystal panels may be used.

What is claimed is:

1. A projection type image display device comprising:
    a polarization converter for making uniform a polarization direction of light emitted from a light source and outputting the light as a predetermined polarized light;
    a separator for separating said polarized light into red light, green light, and blue light;
    an image display element to which polarized light of each said separated color light is radiated and which modulates the polarized light in accordance with a video signal;
    a color synthesizer for color-synthesizing the polarized light of red light, that of green light, and that of blue light after modulation by the image display element; and
    a projection lens unit for projecting on a larger scale an optical image of the color-synthesized polarized light;
    wherein said color synthesizer has an optical characteristic such that the transmittance or quantity of the polarized light of blue light outputted, out of the incident polarized light of red light, that of green light, and that of blue light, is made larger than that of the polarized light of red light or that of green light.

2. A projection type image display device comprising:
    a polarization converter for making uniform a polarization direction of light emitted from a light source and outputting the light as S-polarized light;

a separator for separating said polarization-converted S-polarized light into red light, green light, and blue light;

a transmission type image display element to which S-polarized light of each said separated color light is radiated and which modulates the S-polarized light in accordance with a video signal;

a half-wave plate for converting the modulated S-polarized light of green light into P-polarized light and outputting the P-polarized light of green light;

a color synthesizer comprising a first reflecting film and a second reflecting film, said first reflecting film reflecting the S-polarized light of red light modulated by said image display element and transmitting the P-polarized light of green light outputted from said half-wave plate, said second reflecting film reflecting the modulated S-polarized light of blue light and transmitting the P-polarized light of green light outputted from said half-wave plate, said first and second reflecting films being formed so as to intersect each other nearly perpendicularly; and a projection lens unit for projecting an optical image of said color-synthesized polarized light on a larger scale;

wherein said color synthesizer has an optical characteristic such that the transmittance for the S-polarized light of blue light is higher than the transmittance of the polarized light of red light or that of the polarized light of green light.

3. A projection type image display device comprising:

a polarization converter for making uniform a polarization direction of light emitted from a light source and outputting the light as S-polarized light;

a separator for separating the polarization-converted S-polarized light into red light, green light, and blue light;

a transmission type image display element to which S-polarized light of each said separated color light is radiated and which modulates the polarized light in accordance with a video signal;

a half-wave plate for converting the modulated S-polarized light of green light into P-polarized light and outputting the P-polarized light of green light;

a color synthesizer comprising a first reflecting film and a second reflecting film, said first reflecting film reflecting the S-polarized light of red light modulated by said image display element and transmitting the P-polarized light of green light outputted from said half-wave plate, said second reflecting film reflecting the modulated S-polarized light of blue light and transmitting the P-polarized light of green light outputted from said half-wave plate, said first and second reflecting films being formed so as to intersect each other nearly perpendicularly; and a projection lens unit for projecting an optical image of said color-synthesized polarized light on a larger scale;

wherein said color synthesizer has an optical characteristic such that the quantity of the S-polarized light of blue light outputted from said color synthesizer is larger than that of the S-polarized light of red light outputted from said color synthesizer or that of the polarized light of green light outputted from said color synthesizer.

4. A projection type image display device comprising:

a polarization converter for making uniform a polarization direction of light emitted from a light source and outputting the light as S-polarized light;

a separator for separating said polarization-converted S-polarized light into red light, green light, and blue light;

a reflection type image display element to which S-polarized light of each said separated color light is radiated and which modulates the S-polarized light in accordance with a video signal and outputs the modulated light as P-polarized light;

a half-wave plate for converting each of the modulated P-polarized light of red color and that of blue color each into S-polarized and outputting the S-polarized light;

a color synthesizer comprising a first reflecting film and a second reflecting film, said first reflecting film reflecting the S-polarized light of red light outputted from said half-wave plate and transmitting the P-polarized light of green light, said second reflecting film reflecting the S-polarized light of blue light outputted from said half-wave plate and transmitting the P-polarized light of green light, said first and second reflecting films being formed so as to intersect each other nearly perpendicularly; and a projection lens unit for projecting an optical image of said color-synthesized polarized light on a larger scale;

wherein said color synthesizer transmits the S-polarized light of blue light and red light and P-polarized light of green light in a state in which the transmittance of the S-polarized light of blue light is higher than the transmittance of the S-polarized light of red light or that of the P-polarized light of green light, or in a state in which the quantity of the S-polarized light of blue light outputted from said color synthesizer is larger than the quantity of the S-polarized light of red light outputted from said color synthesizer or that of the P-polarized light of green light outputted from said color synthesizer.

5. The projection type image display device according to claim 1, further comprising a screen unit to which the light projected from said projection lens unit is radiated from a rear side of the screen unit.

6. The projection type image display device according to claim 5, wherein said screen unit has a characteristic that the transmittance for blue light is about 75% or more.

7. The projection type image display device according to claim 3, further comprising a screen unit to constitute a rear projection type image display device, said screen unit allowing optically imaged light to pass therethrough from a first surface side to a second surface side and allowing the image to be displayed on said second surface, said screen unit having a transmittance for at least blue light of about 75% or more.

8. An optical unit comprising:

a polarization converter for making uniform a polarization direction of light emitted from a light source and outputting the light as a predetermined polarized light;

a separator for separating said polarized light into red light, green light, and blue light;

an image display element to which polarized light of each said separated color light is radiated and which modulates the polarized light in accordance with a video signal;

a color synthesizer for color-synthesizing the polarized light of red light, that of green light, and that of blue light after modulation by said image display element; and a projection lens unit for projecting an optical image of said color-synthesized polarized light on a larger scale;

wherein said color synthesizer has an optical characteristic such that the transmittance for S-polarized light of the blue light is higher than that of the polarized light of red light or that of the green light.

9. An optical unit comprising:

a polarization converter for making uniform a polarization direction of light emitted from a light source and outputting the light as a predetermined polarized light;

a separator for separating said polarized light into red light, green light, and blue light;

an image display element to which polarized light of each said separated color light is radiated and which modulates the polarized light in accordance with a video signal;

a color synthesizer for color-synthesizing the polarized light of red light, that of green light, and that of blue light after modulation by said image display element; and a projection lens unit for projecting an optical image of said color-synthesized polarized light on a larger scale;

wherein said color synthesizer has an optical characteristic such that the quantity of S-polarized light of the blue light outputted is larger than that of the polarized light of red light or that of green light.

* * * * *